(No Model.)
J. H. COLLINS.
FRUIT DRIER.
No. 328,462. Patented Oct. 20, 1885.
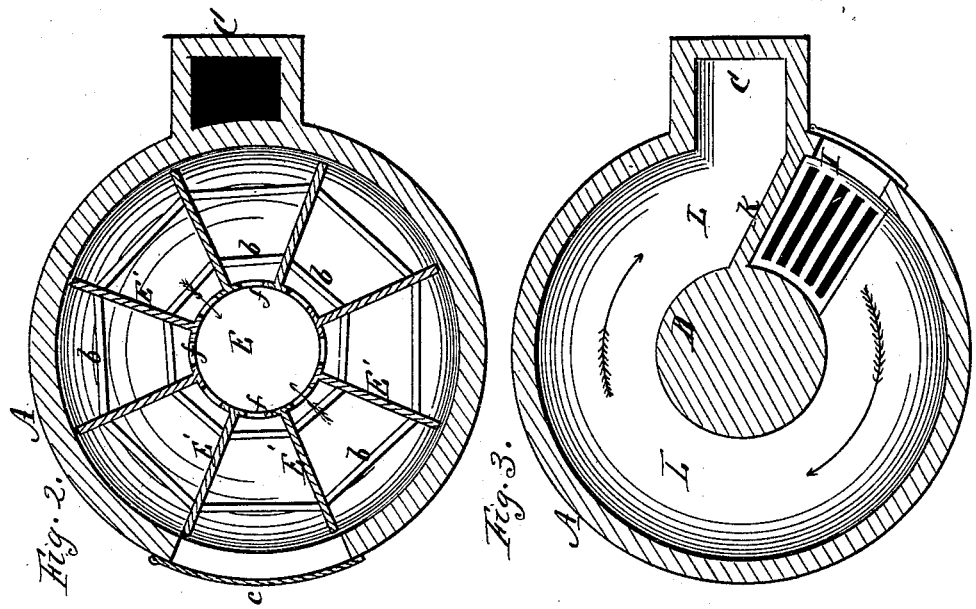
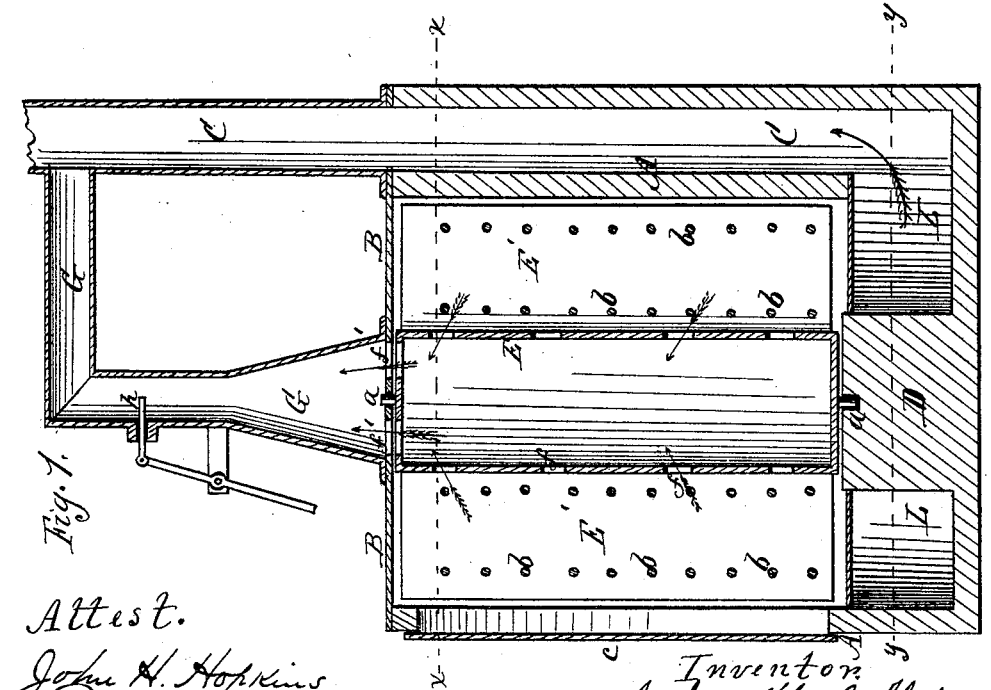

UNITED STATES PATENT OFFICE.

JOHN H. COLLINS, OF PARMA, NEW YORK.

FRUIT-DRIER.

SPECIFICATION forming part of Letters Patent No. 328,462, dated October 20, 1885.

Application filed December 12, 1884. Serial No. 150,148. (No model.)

*To all whom it may concern:*

Be it known that I, JOHN H. COLLINS, of Parma, in the county of Monroe and State of New York, have invented a certain new and useful Improvement in Fruit-Evaporators; and I do hereby declare that the following is a full, clear, and exact description of the same, reference being had to the accompanying drawings, in which—

Figure 1 is a central vertical section of the apparatus. Fig. 2 is a horizontal cross-section of the same in line $x\ x$ of Fig. 1. Fig. 3 is a similar view in line $y\ y$ of Fig. 1.

My improvement relates to apparatus for drying fruits and vegetables; and it consists in the combination of an inclosing wall or case, a revolving reel made in separate compartments for the reception of the trays, a hollow tubular center to the reel with openings in the sides for the passage of the vapor from the trays, and a pipe leading from the top of the case over the cylinder of the reel, for conducting off the vapors, all as hereinafter more fully described.

It also consists in the combination, with the above, of a furnace and a circular flue beneath the reel, through which the products of combustion make a full circuit before reaching the chimney, all as hereinafter described.

In the drawings, A shows the inclosing wall or case, which is cylindrical in form, with a closed top, B, and having on one side a chimney, C, for the escape of the products of combustion.

D is a central butment or block in the center of the case for the support of the reel.

E is the reel, having journals $a\ a$ at top and bottom, on which the reel turns. The reel is composed of a central hollow cylinder, E, closed at top and bottom, to which the journals $a\ a$ are attached, and a series of radial partitions, E' E', which extend out nearly to the walls of the case and divide the reel into as many separate compartments as there are partitions, said compartments, however, being open at top and bottom. These compartments are each provided with a series of rods or other supports, $b\ b$, at regular intervals apart, for the reception of the trays. The trays are placed in the compartments through a door, $c$, in one side of the case, and as fast as filled in at one compartment the reel is turned by hand, or by other means, to bring the next compartment to the door, and the operation is so timed that when the first compartment has made a full revolution the fruit shall have become sufficiently dried to be removed from place.

$f\ f$ are openings in the sides of the cylinder E, through which the vapor is drawn from the fruit and carried off, and a sufficient number of these openings are made to remove all the moisture and prevent it from passing up through the fruit, as in ordinary evaporators.

G is an exit-pipe, resting on top of the case over the cylinder E, and extending thence to the chimney C, or to any other desired point. Draft-holes $f'\ f'$ are made through the top of the cylinder E and through the top of the case, communicating with the pipe, and by this means an active draft is made through the cylinder to carry off the moisture. A valve, $h$, is made in the pipe, operated by a lever, cord, or other means for controlling the draft. This valve is necessary to produce perfect action in drying.

By the means above described the apparatus is made in very compact compass, it is much cheaper than the high towers in common use, the moisture is carried off at once and is prevented from passing up through the fruit in the higher trays, as is ordinarily the case, and as a consequence more rapid work is done, and a better article is produced.

I is a furnace or grate on one side, close to the chimney, but separated therefrom by a partition, K.

L is a circular flue extending from the grate and passing around the butment D, making a full circuit, when it opens into the chimney C close to the point from which it started. The top of the flue is covered by a thin plate, and in so long a passage the heat is nearly all radiated upward into the case under the reel, where it passes up and escapes through the openings $f\ f$, carrying the vapor with it. This is a cheap and effective means of producing the heat.

Having described my invention, what I claim as new, and desire to secure by Letters Patent, is—

1. In a fruit-evaporator, the combination of the inclosing wall or case, the chimney on one side, the reel consisting of a central hollow cylinder and radial partitions with draft-holes through the sides of the cylinder, and the exit-pipe over the top of the case, resting above the cylinder and communicating therewith through openings in the top of the cylinder and case, as shown and described, and for the purpose specified.

2. In a fruit-evaporator, the combination of the inclosing-case, the chimney on one side, the reel consisting of a central perforated cylinder and radial partitions, the exit-pipe opening from the top of the case over the cylinder, the furnace or grate next to the chimney but separated therefrom by a partition, and the circular flue extending from the furnace around to the chimney, as shown and described, and for the purpose specified.

In witness whereof I have hereunto signed my name in the presence of two subscribing witnesses.

JOHN H. COLLINS.

Witnesses:
R. F. OSGOOD,
B. J. COLLINS.